US00RE34071E

United States Patent [19]

Van Bilderbeek

[11] E Patent Number: Re. 34,071

[45] Reissued Date of Patent: Sep. 22, 1992

[54] SURFACE WELLHEAD

[75] Inventor: Bernard H. Van Bilderbeek, Houston, Tex.

[73] Assignee: Ingram Cactus Company, Houston, Tex.

[21] Appl. No.: 706,024

[22] Filed: May 28, 1991

Related U.S. Patent Documents

Reissue of:

[64] Patent No.: 4,938,289
Issued: Jul. 3, 1990
Appl. No.: 274,192
Filed: Nov. 21, 1988

U.S. Applications:

[63] Continuation-in-part of Ser. No. 65,299, Jun. 22, 1987, Pat. No. 4,794,988.

[51] Int. Cl.[5] ..... E21B 7/12

[52] U.S. Cl. ..... 166/342; 166/352; 166/368

[58] Field of Search ..... 166/342, 343, 345, 346, 166/351, 352, 360, 368, 380, 382, 208

[56] References Cited

U.S. PATENT DOCUMENTS

| | | | |
|---|---|---|---|
| 3,791,442 | 2/1974 | Watkins | 166/352 |
| 4,408,783 | 10/1983 | Gruller | 285/3 |
| 4,465,134 | 8/1984 | Wakins | 166/245 |
| 4,557,332 | 12/1985 | Denison et al. | 166/345 |

FOREIGN PATENT DOCUMENTS 1171201 11/1969 United Kingdom .

OTHER PUBLICATIONS

Drawing SK 6968, Cameron Iron Works, Houston, Tex.

*Primary Examiner*—William P. Neuder
*Attorney, Agent, or Firm*—Ben D. Tobor

[57] ABSTRACT

A casing installation system usable with tubular casing having an upper end portion and a lower portion, for anchoring the upper end portion of the casing on an outer casing string secured to a wellhead having a housing, the wellhead housing being positioned at a fixed position over a well, said casing extending upwardly to the wellhead from a location in the well at which location the lower portion of the casing is landed, the upper end of the casing being terminated by a generally annular casing hanger secured to the casing, said outer casing string having an upwardly-facing shoulder, the system also having a locking ring located on the casing hanger and movable thereon in a direction towards the lower end portion of the casing, the locking ring having means for preventing its movement on the casing in a direction away from the lower end portion of the casing in response to a force exerted on the locking ring in said direction away from the lower end of the casing, the locking ring having a downwardly-facing shoulder engageable with the upwardly-facing shoulder on the outer casing string.

45 Claims, 7 Drawing Sheets

SURFACE WELLHEAD

Matter enclosed in heavy brackets [ ] appears in the original patent but forms no part of this reissue specification; matter printed in italics indicates the additions made by reissue.

This Application is a Continuation-In-Part of Ser. No. 065,299 filed Jun. 22, 1987, now U.S. Pat. No. 4,794,988.

This invention relates to a hanger assembly for use in an surface wellhead system.

BACKGROUND OF THE INVENTION

In order to expedite cash flow and to minimise the period between development drilling and production flow, more and more companies operating in the oil and gas business are resorting to what is commonly referred to as 'Early Production Systems'.

These 'Early Production Systems' use a method of predrilling wells prior to the installation of jacket structures which allows an operator to mate a completed production jacket over pre-drilled wells which are subsequently tied back to the surface and can be brought into production within a short period of completing the topside of the production jacket.

The drilling components used to pre-drill wells have been developed to provide such features as needed for effective reconnection of casing strings which were disconnected prior to installation of the jacket. These systems, commonly referred to as 'mudline casing support equipment for jack up operations' and 'subsea wellhead equipment for floating rig operations' are organized in a fixed grid structure over which the production jacket is placed so that the tie-back strings, guided through fixed guides which are part of the platform structure, can enter connection receptacles which are part of the mudline support system or the subsea wellhead system. Once the casing strings are tied-back, they are terminated on the production deck of the platform with the use of conventional surface wellhead equipment.

It is desirable that the tied-back casing strings should be under tension on installation, because heat generated by production fluids within the production tubing causes linear expansion of the casings which could otherwise cause them to buckle through induced compression. The casing strings therefore are tensioned at the surface wellhead and wedges are driven in between the casings and the high-pressure wellhead housing to maintain the tension. However, this known wedging system is imprecise in the amount of tension maintained as slippage can occur as the wedges are driven, and this becomes an acute problem on relatively short lengths of casing.

During drilling operations also it is often necessary to attach a length of casing at its lower end and connect its upper end to a fixture at a wellhead, in which case the upper end requires a fixing system allowing precise connection of the upper end. A similar wedging system to that used in tie-back operations can be used, with the same disadvantages, or the upper end of the casing may be cut to the desired length and a "slip-on" wellhead used. There is some doubt as to whether current designs of slip-on wellheads provide a secure fixing of the wellhead to the casing in a manner capable of withstanding very high fluid pressures such as those experienced during well blow-out.

In such operations it may or may not be necessary to pretension the casing before fixing; if the casing is not likely to be subject to substantial temperature changes pretensioning can be dispensed with.

SUMMARY OF THE INVENTION

An object of the invention is to [provided] *provide* a method of installing tubular casing, the casing having a main axis and having a lower portion which has a locating member for engagement with a first fixture, and an upper portion which has an engagement member for engaging a support member on a second fixture in fixed spatial relationship to the first fixture, the engagement member and the support member being relatively movable in a direction axially of the casing, the method comprising setting the distance between the locating member and the engagement member greater than the distance between the first fixture and the support member, engaging the locating member with the first fixture, and bringing the engagement member and the support member into engagement thereby to lock the casing between the first fixture and the support member.

Further according to the invention there is provided casing installation apparatus comprising a tubular casing having a main axis and having an upper portion and a lower portion, the casing extending upwardly from a first location at which the lower portion of the casing has a locating member in engagement with a first fixture to a second location at which a second fixture is in fixed spatial relationship to the first fixture, an engagement member on the casing at its said upper portion and a support member on the second fixture, the engagement member and the support member being relatively movable in a direction axially of the casing between a first position in which, with the locating member in engagement with the first fixture, the engagement member is spaced upwardly of the support member and a second position in which, with the locating member retained in engagement with the first fixture, the engagement member and the support member are mutually engaged.

The invention also provides a casing installation system usable with tubular casing which has a main axis and upper and lower portions, for anchoring the upper portion on an outer casing string secured to a wellhead having a housing, the wellhead housing being at a fixed position over a well, the casing extending upwardly from a location in the well at which the lower portion of the casing engages the outer casing string, said outer casing string having an [upwardlyfacing] *upwardly-facing* shoulder and the upper portion of the casing having a corresponding downwardly-facing shoulder, said shoulders being relatively movable axially of the casing between a first position in which the downwardly-facing shoulder is spaced upwardly of the upwardly-facing shoulder and a second position in which said shoulders are in mutual engagement, and means for maintaining said shoulders in mutual engagement.

A further object of the invention is to provide a casing installation system which can be employed while a blow-out preventer is in position above the casing strings whereby manipulation or adjustment of the casing being installed, and its associated equipment, can be made while the well is fully protected.

BRIEF DESCRIPTION OF THE DRAWINGS

An embodiment of the present invention will now be described by way of example with reference to the accompanying drawings in which.

DESCRIPTION OF PREFERRED EMBODIMENTS

Figure 1:
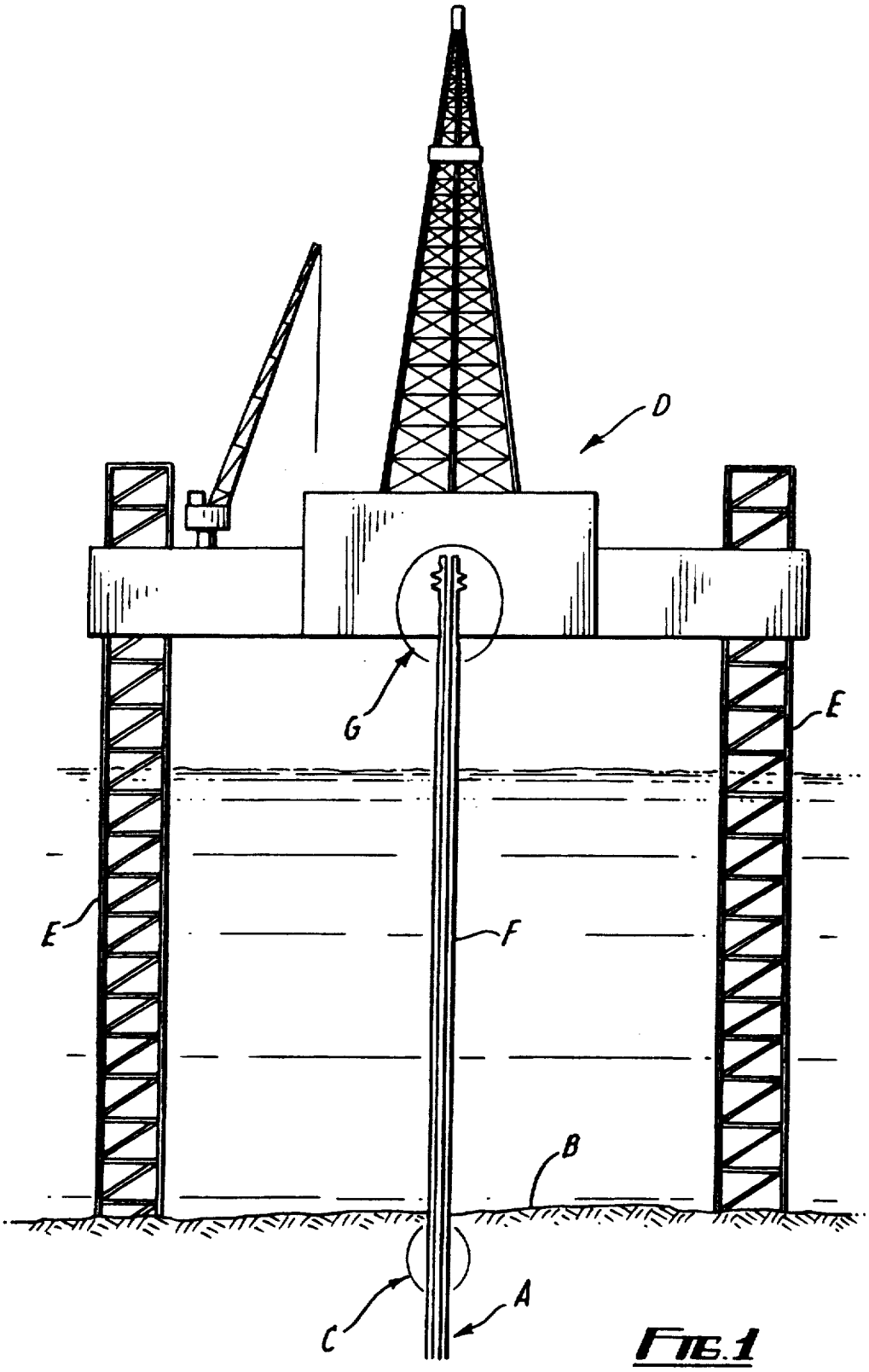
FIG. 1 is a schematic view of an offshore oil production platform having surface wellhead apparatus of the invention.

Referring first to FIG. 1, a pre-drilled oil well A extends downwards through the sea bed from the mudline B at which a "centric 15" mudline suspension system C including a fixed casing hanger is located. After the well A has been drilled, it is sealed at the suspension system C until production is to be carried out. At that stage a production platform D is located above the oil well A, supported on legs E, and a tie-back string including concentric casing F is lowered from the platform D to the mudline suspension system C.

The lower end of the casing F is secured to the hanger at the suspension system C and tensioned upwardly from a surface wellhead system G on the platform D, as will now be described with reference to FIGS. 2 and 3.

Figure 2:
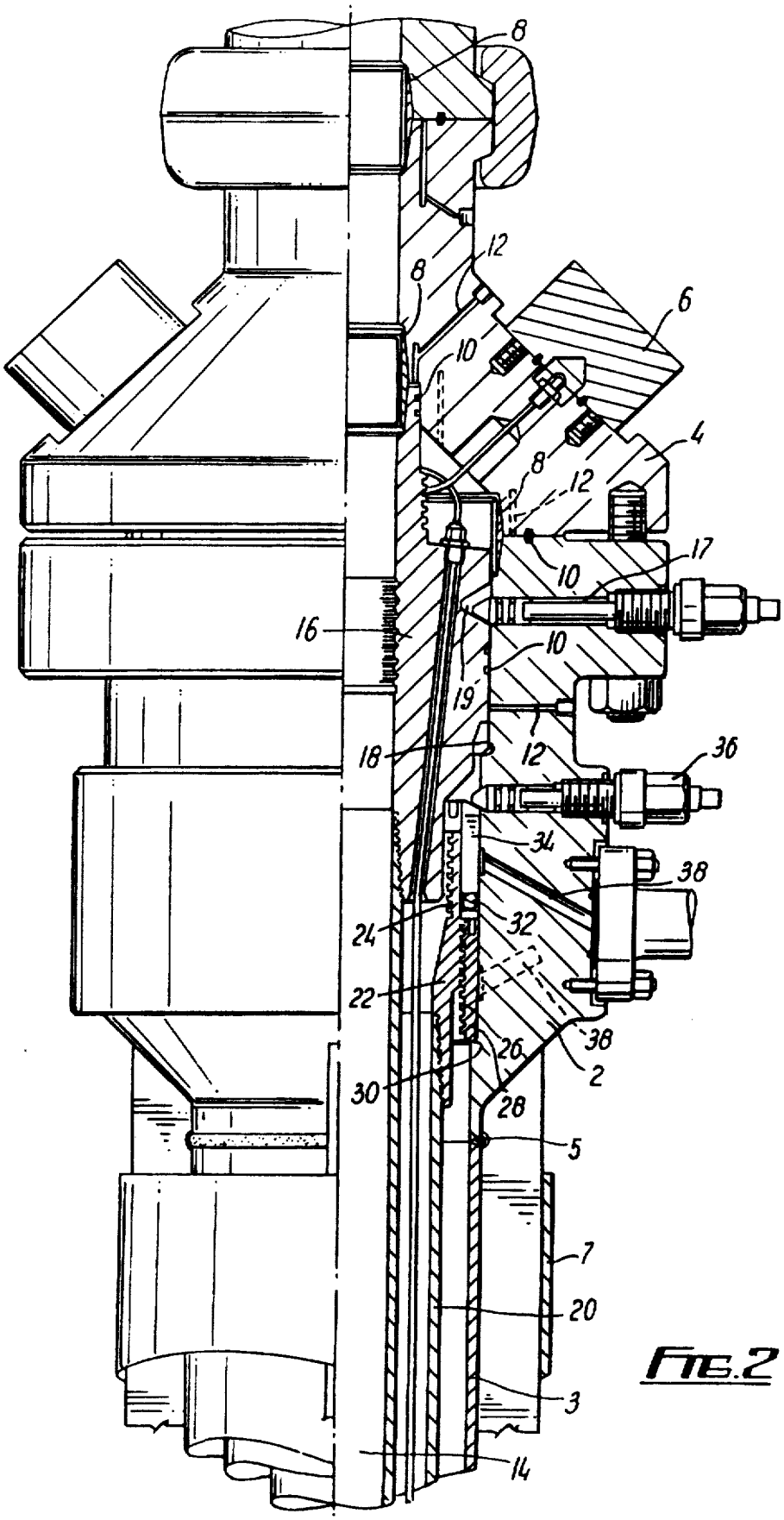
FIG. 2 is a side part-sectional view of surface wellhead apparatus of the present invention.

In FIG. 2, the surface wellhead comprises a high-pressure housing 2 which is permanently attached to a 13⅜ inch casing 3 by a girth weld 5. An annulus formed between the 13⅜ inch casing 3 and a 20 inch conductor casing 7 is shown as vented, but attachments may be provided to control this annulus if required. A tubing head adaptor spool 4 is bolted to the housing 2, and a block manifold 6 for connection to a downhole safety valve is bolted to the adaptor spool 4. Metal-to-metal seals 8 are provided on the wellhead to prevent leakage of fluid, with back-up seals 10 spaced from the main seals 8 to allow the provision of monitoring ports 12 between them for checking for leakage.

A production tubing 14 extends into the wellhead and terminates in a hanger 16 which is suspended from a landing shoulder 13 on the housing 2. The hanger 16 is held on the shoulder 18 against upward movement by bolts 17 having a tapered end portion, the bolts 17 being spaced around the housing 2 and passing through the housing to engage in an inwardly-tapering annular recess 19 in the hanger 16.

An innermost casing 20 of 9⅝ inches diameter concentric with the tubing 14 engages the fixed casing hanger at the mudline at its lower end and has a hanger 22 at its upper end having an internal screw thread 24 and an external screw thread 26. The external thread 26 is engaged by an internally-screw-threaded annular sleeve 28 which rests on a landing shoulder 30 formed on the housing 2. Thus the casing 20 is located on the housing 2 through the hanger 22 and sleeve 23.

An S-type annular metal-to-metal seal 32 is located above the sleeve 28 between the hanger 22 and housing 2, and a locating ring 34 retains the seal 32 and maintains the sleeve 28 tightly against the shoulder 30, being forced downwards by tapered radial bolts 36 which pass through the housing 2 and engage in a correspondingly-inclined upper face of the ring 34. Thus rotation of the bolts 36 so that they travel radially inwardly through the housing 2 causes the ring 34 to be urged downwardly into tighter engagement with the sleeve 28.

Monitoring ports 38 extend from above and below the seal 32 for checking for fluid leakage.

Figure 3:
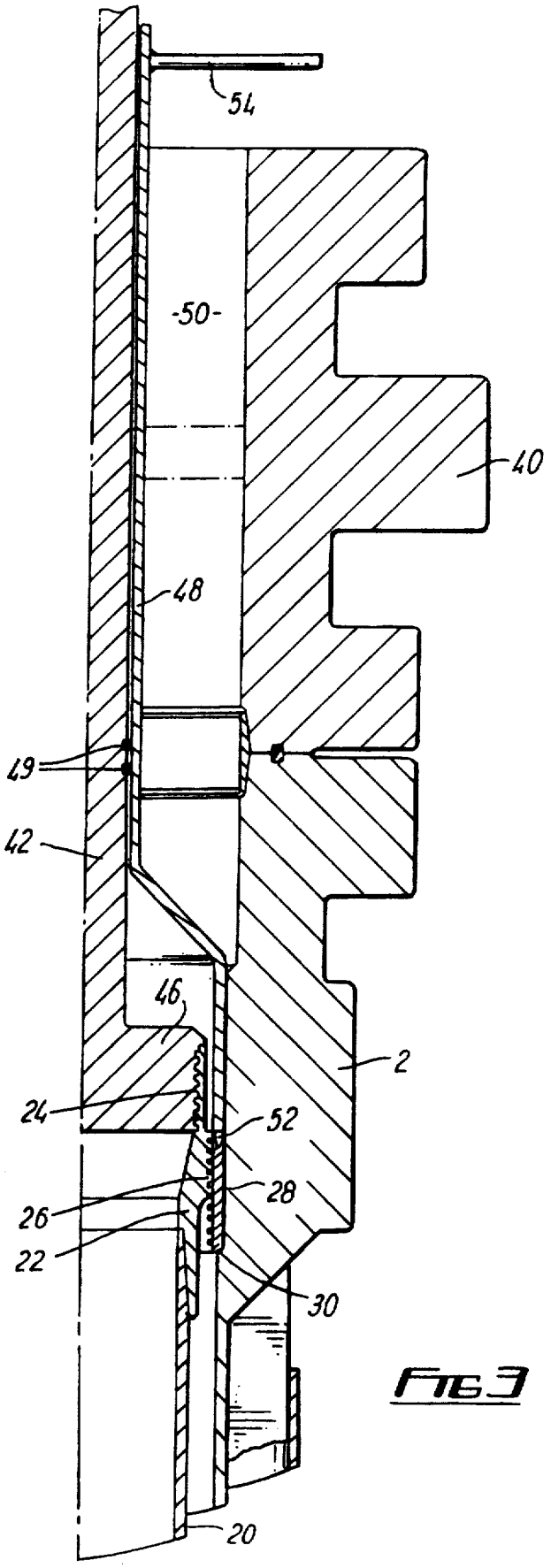
FIG. 3 is a view corresponding generally to the sectioned portion of FIG. 2 showing the manner of installation and setting of the apparatus.

FIG. 3 illustrates the manner of installation of the apparatus at the surface wellhead; blow-out preventers 40 replace the adaptor spool 4 during connection of the wellhead to a pre-drilled well at the sea bed. Prior to installation of the production tubing 14 the casing strings are connected to a fixed point of the mudline casing hanger at the sea bed and passed into the wellhead for connection. A hanger running tool 42 which supports the casing during installation passes with the casing 20 down a central aperture through the blow-out preventers 40 and the housing 2 until the sleeve 28 spaces out above the shoulder 30. The running tool 42 has at its lower end a flange 46 which is externally screw-threaded to engage with the internal screw-thread 24 of the hanger 22. The tool 42 is pre-engaged with the hanger 22 by rotation.

An activator sleeve 48 disposed around the running tool 42 has a series of spaced pins 52 at its lower end which engage in corresponding recesses in the upper face of the sleeve 28 to lock the sleeves 48, 28 together for rotation. The activator sleeve 48 has a handle 54 at its upper end for use in rotating the sleeves.

An upward force is applied to the running tool 42 which has the effect of tensioning and stretching the casing 20, which raises the upper end of the casing and lifts the sleeve 28 upwards further away from the landing shoulder 30. When a desired tension has been applied and is being maintained by the tool 42 the activator sleeve 48 is rotated, causing the sleeve 28 also to rotate and move downwardly on its threaded connection 26 with the hanger 22 until it lands on the shoulder 30. The applied tension of the running tool 42 can then be released, the tension in the casing 20 being maintained by the engagement of the sleeve 28 on the shoulder 30. Precise control of the tension in the casing is thus obtained by manipulation through the well control equipment above the surface wellhead, while the option of shutting in the well at the surface is maintained if required by virtue of seals 49 between the activator sleeve 48 and the running stem of the running tool 42. The activator sleeve 48 and running tool 42 are then removed, and the seal 32 and the locating ring 34 are installed (FIG. 2) to seal off the annulus 50. The radial bolts 36 are then inserted and tightened against the ring 34, compressing and activating the seal 32 and locking the sleeve 28 and the hanger 22 in position against the shoulder 28.

The assembly of this embodiment of the invention allows manipulation of the casing 20 to a precise predetermined tension and accurate spacing-out of the fixings at top and bottom of the casing 20 by means of the positive location of the hanger 22 on the housing 2 through the adjustable sleeve 28 landing on the shoulder 30. The installation procedure can be carried out while maintaining well control at all times, as it is performed through the well control equipment located above the surface wellhead whilst the option to shut in the well at the surface is retained during the tie-back operation.

FIG. 4(a) shows an alternative form of the apparatus, in the mode where the casing 20 has been run and latched into the mudline casing hanger, and tension is being applied to the casing 20 prior to location of the sleeve 28 on the shoulder 30. In this embodiment the running tool 42 has teeth 60 around its outer circumference which mate with teeth on an upper end of a [rung] *ring* 62 disposed around the running tool 42. The ring 62 comprises an annular body within which is held a cam 68 movable radially of the body and maintained in the outermost position by a cam surface 70 on the running tool 42. The ring 62 has further teeth 64 around an outer face at its lower end, and these mate with corresponding teeth on an inner face of the casing hanger 22. This arrangement ensures that there is a solid connection between the running tool 42 and the casing hanger 22 through the ring 62 for rotation of the casing 22 to latch it into the mudline casing hanger, and avoids the less satisfactory screw-threaded connection of FIG. 3.

FIG. 4(b) shows the casing 20 maintained in tension by engagement of the sleeve 28 with the shoulder 30, this being achieved by rotation of the sleeve 28 on the screw thread of the casing hanger 22 to move it downwards into engagement with the shoulder 30 while pulling upwards on the running tool 42. The running tool 42 transfers the upward force to the casing 20 through the ring 62, cam 68 and hanger 22. Rotation of the sleeve 28 is by application of rotational force to the handle 54 of the activator sleeve 48 and transfer of that force to the sleeve 28 through the pin and recess connection 52 between the activator sleeve 48 and the sleeve 28.

Figure 4:
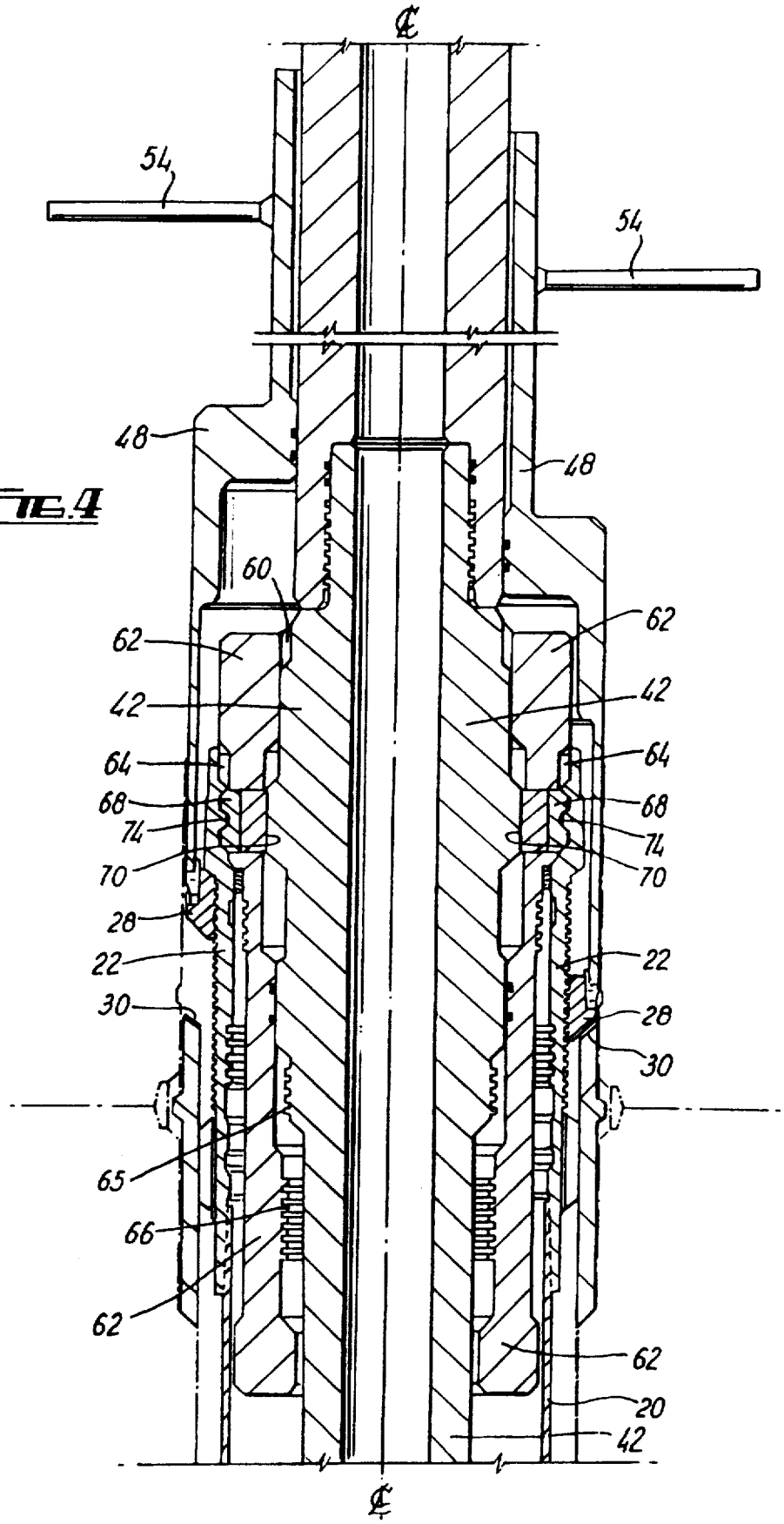
FIGS. 4(a) and (b) are side sectional views showing the manner of setting apparatus of a further embodiment of the invention, with the high pressure housing removed for clarity.

Installation of the apparatus of FIG. 4 is as follows. A screw thread 64 on an external face of the running tool 42 is engaged with a screw thread 66 on an internal face of the body of the ring 62 so that the cam surface 70 is spaced below the cam 68 which collapses inwardly. The teeth 60 on the running tool are disengaged from and spaced below the teeth on the ring 62.

The running tool 42 and ring 62 are moved downwardly until the teeth 64 of the ring 62 abut the top of the casing hanger 22. The assembly is then rotated to allow the teeth 64 to mesh with the teeth in the top of the casing hanger 22, allowing the assembly to move further downwards over the hanger 22. The meshing teeth 64 hold the ring 62 and hanger 22 against relative rotation.

The running tool 42 is then rotated to unscrew the threads 64 and 66, causing the running tool 42 to move upwardly relative to the ring 62 as it disengages from it. This brings the surface 70 into engagement with the cam 68, forcing the cam 68 radially outwardly into engagement with a corresponding profile 74 on an inner face of the casing hanger 22 and thus locking the hanger 22 and ring 62 together against relative vertical movement.

On complete disengagement of the threads 64 and 66, the running tool 42 is pulled upwardly, causing the teeth 60 to engage with the corresponding teeth in the running tool 42 and moving the cam surface 70 into full engagement with the cam 68 as shown. This places the assembly in condition for latching the casing 20 into the mudline casing hanger as described above.

To remove the assembly after installation and tensioning of the casing 20, the above procedure is reversed to disconnect the assembly comprising the running tool 42, the ring 62 with the cam 68, and the activator sleeve 48 from the casing hanger 22 and sleeve 28, and the assembly is then withdrawn.

Figure 5:
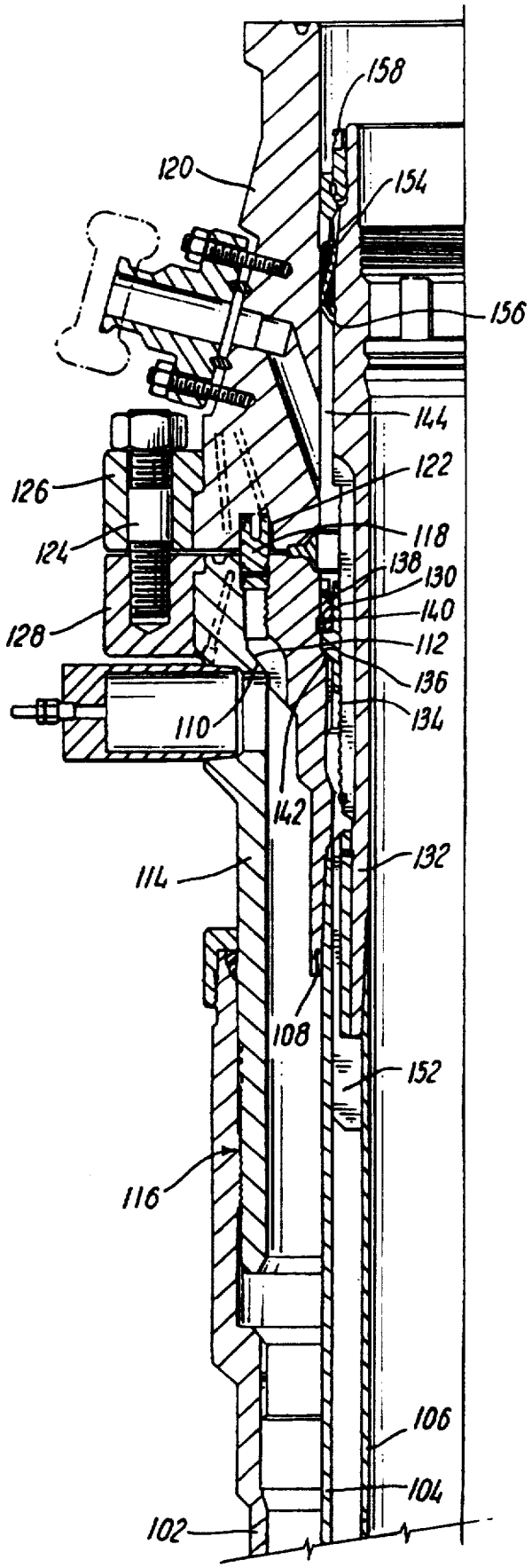
FIG. 5 is a side sectional view of one half of an alternative embodiment of apparatus of the present invention in use during a drilling operation.
Figure 6:
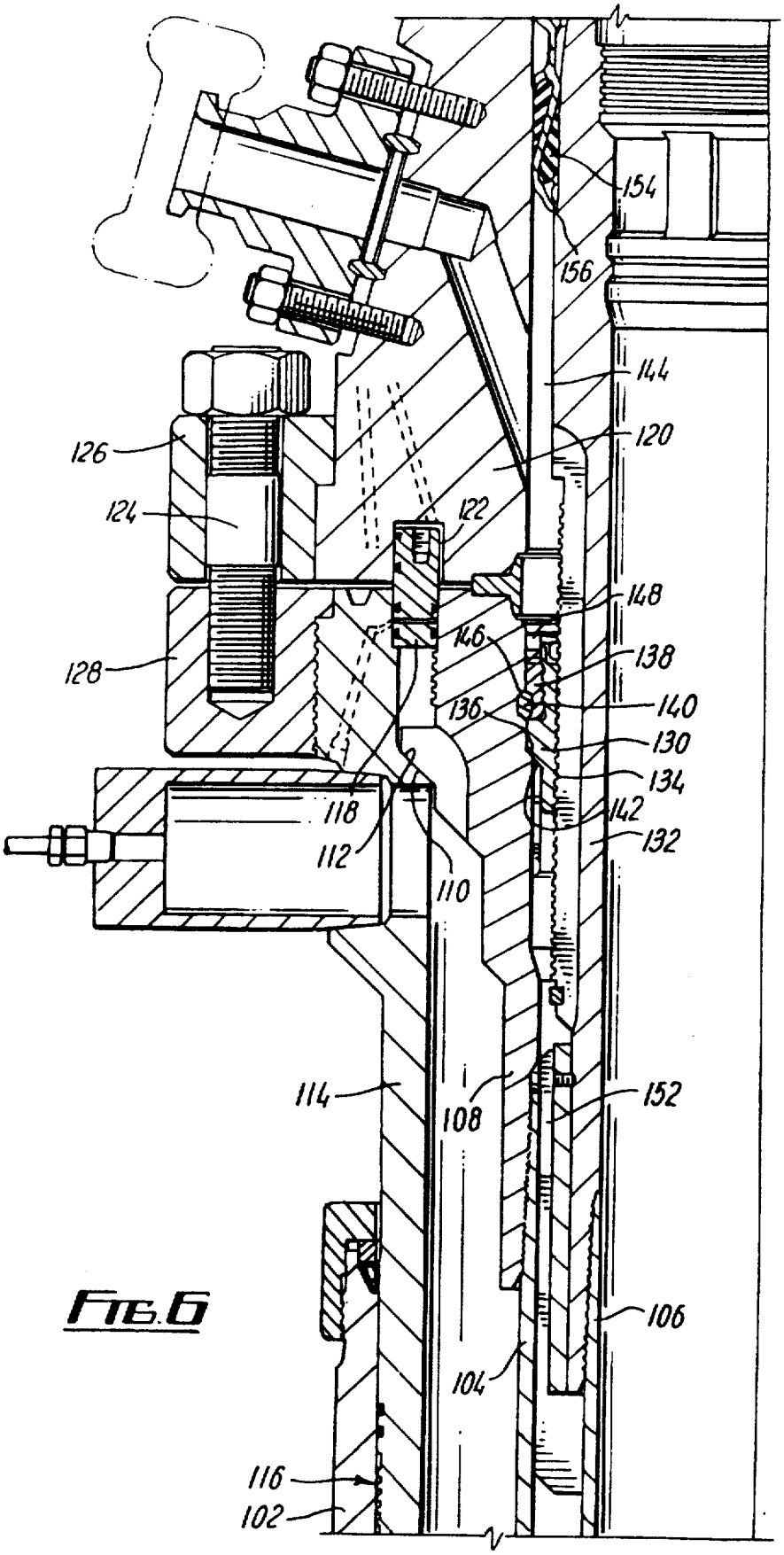
FIG. 6 is an enlarged portion of FIG. 5.

Referring now to FIGS. 5 and 6, there are shown a 20 inch casing 102, a 13⅜ inch casing 104 and a 9⅝ inch casing 106 all installed concentrically in a well bore and extending upwards to a surface wellhead assembly. The casing system is installed as follows.

After running the 20 inch casing 102 in the well bore and cementing it in position, drilling operations are commenced, following which the low-pressure BOP stack is removed. The 13⅜ casing 104 is run within the 20 inch casing and landed lower in the well at a level at which a 13⅜ inch casing hanger 108 mounted on the casing 104 has a landing shoulder 110 spaced a few inches above a corresponding shoulder 112 on a 20 inch casing head 114. The casing head 114 is screw-threaded at 116 in an adjustable manner to the upper end of the casing 102, and the head 114 is then manipulated by screwing to move it upwards relative to the casing 102 until its shoulder 112 meets the shoulder 110 of the casing hanger 108, as shown. An annular sealing member 118 is then inserted between the casing head 114 and the hanger [109] *108* and a wellhead housing 120, which has an annular recess 122 to receive the sealing member 118, is located in position and bolted to the casing head 114 through bolts 124 which pass through a ring 126 (which is freely rotatable on the wellhead housing 120) and into a flange 128 secured on the casing head 114.

A high pressure blow-out preventer (not shown) is then installed on top of the wellhead housing 120.

The 9⅝ inch casing 106 is run and landed lower in the well on a landing shoulder (not shown) on the 13⅜ inch casing 104, and a locking ring 130, which is mounted at an upper end of its screw-thread connection at 134 with a hanger 132 of the 9⅝ inch casing 106, is then spaced above a shoulder 136 on the 13⅜ inch casing hanger 108.

The locking ring 130 has a nut 138 screw-threaded on it, and initially this nut 138 is disposed at the top of its screw-thread connection so that its lower face is spaced above a horizontal face of the locking ring 130; this allows a split ring 140 to sit between the locking ring 130 and the nut 138, inboard of their outermost faces. The nut 138 is held in this position on the locking ring 130 by a shear pin.

In order to bring a landing shoulder 142 of the locking ring 130 into engagement with the shoulder 136 of the 13⅜ inch casing hanger 108, a manipulating tool (not shown) is passed through the blow-out preventer and along an annular space 144 between the wellhead housing 120 and the 9⅝ inch casing hanger 132 to engage in recesses 148 in the upper face of the nut 138. This tool is then turned to rotate the nut 138, locking ring 130 and split ring 140, moving them along the thread of the casing hanger 132 until the shoulder 142 of the locking ring 130 lands on the shoulder 136 of the hanger 108.

If necessary the casing 106 may be tensioned by applying a force in an upwards direction either mechanically through the hanger 132 or hydraulically by sealing and pressurising the interior of the casing 106, whereupon the locking ring 130 can travel further along the casing before encountering the shoulder 136 and thus maintain the tension in the casing 106. Alternatively, and especially if the casing is unlikely to be subjected to large changes in temperature, such tensioning may be omitted.

When the shoulder 142 is landed on the shoulder 136, the split ring 140 is disposed opposite an annular recess 146 in the 13⅜ inch casing hanger 108. Continued rotation of the nut 138 causes the shear pin to shear and the nut 138 to move downwardly along the locking ring 130. As it does so, corresponding tapered faces on the nut 138 and split ring 140 force the split ring 140 radially outwardly into the recess in the 13⅜ inch casing hanger as shown, preventing any tendency of the locking ring 130 to move upwards.

The annulus between the 13⅜ inch casing 104 and the 9⅝ inch casing 106 is maintained parallel by the full-bore extent of the locking ring 130, nut 138 and split ring 140 and a centraliser 152 spaced downwardly from the locking ring assembly.

An annular metal-to-metal pack-off seal with resilient seal back-up 154 is then inserted into the annulus and secured between a shoulder 156 on the casing hanger 132 and a nut 158 which is screwed down onto the seal 154 to set the seal.

Thus, in the embodiment shown in FIG. 5 the invention is used in a drilling, rather than a tie-back, situation.

Figure 7:
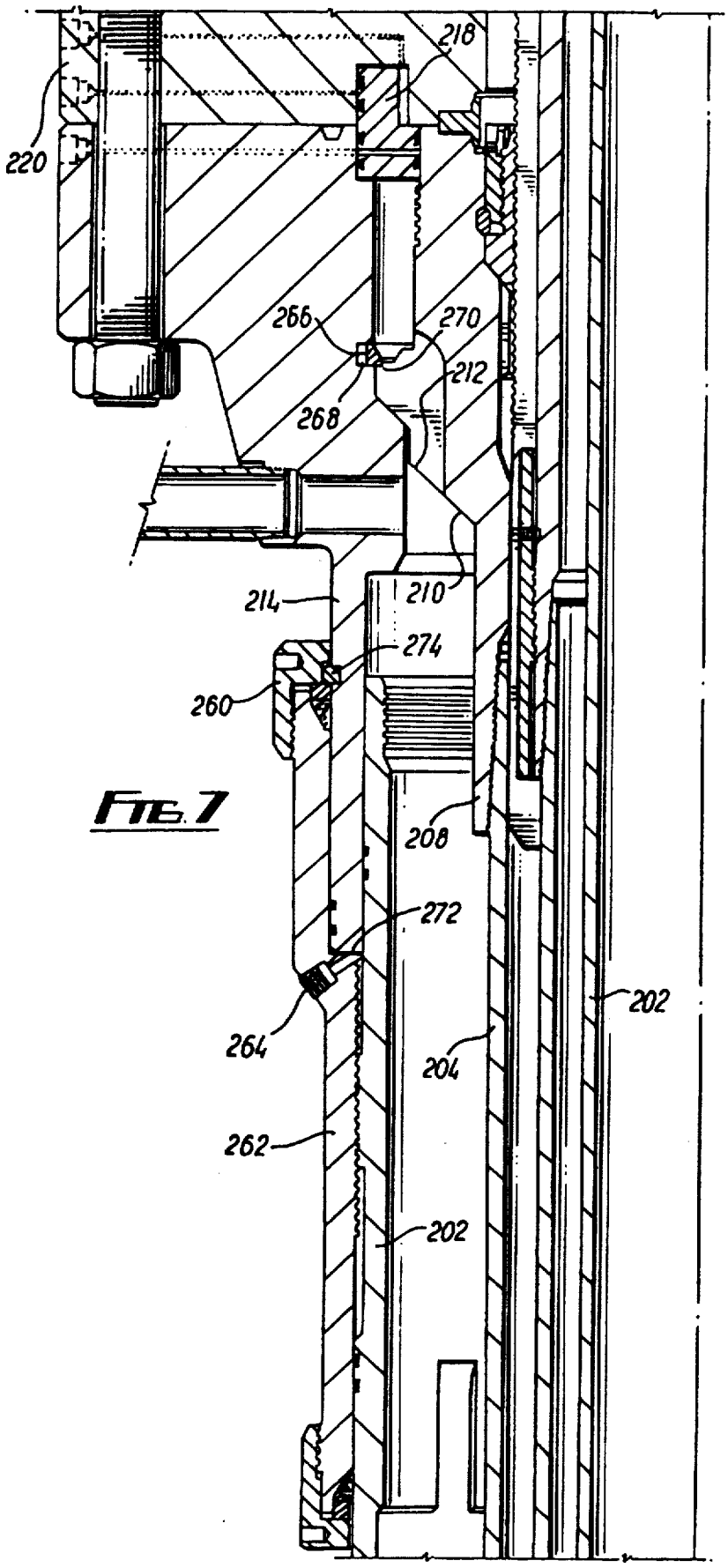
FIG. 7 is a side sectional view of an alternative embodiment of the invention.

In FIG. 7, the equipment is in principle generally the same as in FIGS. 5 and 6 (although in FIG. 7 an inner casing string 202 has also been run) but the adjustment of the casing head 214 is performed not by rotation (as in FIGS. 5 and 6) but by hydraulic pressure, as will now be described.

FIG. 7 shows the casing head 214 in its final position in engagement with the 13⅜ inch casing hanger 208, but after installation of the 13⅜ inch casing 204 on a landing shoulder on the 20 inch casing lower in the well, the shoulder 212 of the casing head 214 is spaced below the shoulder 210 of the casing hanger 208 and requires to be adjusted to meet it.

At that stage a lock nut 262 is located at a lower end of its screw-thread connection with the outer face of the 20 inch casing 202, with a low pressure BOP stack installed on the top of the casing head 214. (In the drawing the BOP stack has been replaced, following installation of the casing strings, with the wellhead housing 220). As the intention is to pack-off the casing annulus between the 20 inch and 13⅜ inch casings with the low pressure BOP in place and since the BOP stack cannot practically be rotated so the adjustment of the casing head cannot be performed by the method illustrated in FIGS. 5 and 6, a hydraulic method is used to effect this adjustment.

A nut 260 on the top of the lock nut 262 is unscrewed until it is free of the lock nut 262, thus releasing the casing head 214 for upward movement relative to the lock nut 262 [30] and the casing 202. The 13⅜ inch casing is then pulled upwards by a derrick on the drilling rig to place the casing under tension. With the tension maintained, pressurised hydraulic fluid is pumped through a port 264 into the annulus between the lock nut 262 and the 20 inch casing 202, thus forcing the casing head 214 upwards until its shoulder 212 engages the shoulder 210 of the casing hanger 208. At that point an inwardly-biased split ring 266 located in a recess 268 in the casing head 214 snaps into engagement with an upwardly-facing shoulder 270 of the casing hanger 208 to lock the casing head 214 and hanger 208 together.

With the tension from the derrick still maintained, the fluid pressure through the port 264 is released and the lock nut 262 is rotated to move upwardly on the casing 202 until its shoulder 272 engages the lowermost face of the casing head 214 as shown.

The nut 260 is then re-engaged with the lock nut 262 and screwed down until it meets a ring 274 projecting from a recess in the casing head 214, thus locking the lock nut 262 against further movement relative to the casing head 214.

The tension in the 13⅜ casing is then held, and the connection to the derrick can be released.

Figure 7A:
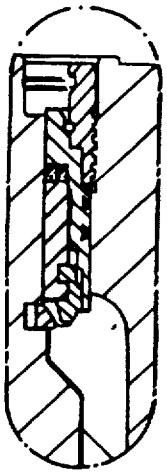
FIG. 7A is a side sectional view of a pack-off seal which can be employed in the embodiment of FIG. 7.

FIG. 7A shows an alternative pack-off seal to those illustrated in FIGS. 5, 6 and 7. In the latter the seals 118, 218 are set and held by the wellhead housing 120, 220 and the annulus between the 20 inch casing 102, 202 and 13⅜ inch casing 104, 204 is open after removal of the BOP stack and before installation of the housing. The pack-off seal of FIG. 7A can be installed through the BOP and is immediately effective before BOP removal.

I claim:

1. A method of installing tubular casing, the casing having a main axis and having a lower portion which has a locating member for engagement with a first fixture, and an upper portion which has an engagement member for engaging a support member on a second fixture in fixed spatial relationship to the first fixture, the engagement member and the support member being relatively movable in a direction axially of the casing, the method comprising setting the distance between the locating member and the engagement member greater than the distance between the first fixture and the support member, engaging the locating member with the first fixture, and bringing the engagement member and the support member into engagement thereby to lock the casing between the first fixture and the support member.

2. A method as claimed in claim 1, wherein the engagement member is annular and is movable on the casing in a direction axially of the casing.

3. A method as claimed in claim 2, wherein the engagement member is in screw-threaded engagement with the casing.

4. A method as claimed in claim 1, wherein the support member is movable on the second fixture in a direction axially of the casing.

5. A method as claimed in claim 4, wherein the support member is in screw-threaded engagement with the second fixture.

6. A method as claimed in claim 4, wherein the support member is movable on the second fixture under the influence of fluid pressure, and the support member is brought into engagement with the engagement member by injecting pressurised fluid into a chamber, a portion of a wall of which is formed by the support member, the fluid pressure causing expansion of the chamber by upward movement of the support member.

7. A method as claimed in claim 1, wherein the engagement member comprises a downwardly-facing shoulder on the casing and the support member comprises a corresponding upwardly facing shoulder on the second fixture.

8. A method as claimed in claim 1, wherein the casing is placed under tension by applying a force in an upward direction prior to bringing the engagement member and the support member into engagement.

9. A method as claimed in claim 1, wherein the engagement member and the support member are brought into engagement while a blow-out preventer is located above them on the second fixture.

10. Casing installation apparatus comprising a tubular casing having a main axis and having an upper portion and a lower portion, the casing extending upwardly from a first location at which the lower portion of the casing has a locating member in engagement with a first fixture to a second location at which a second fixture is in fixed spatial relationship to the first fixture, an engagement member on the casing at its said upper portion and a support member on the second fixture, the engagement member and the support member being relatively movable in a direction axially of the casing between a first position in which, with the locating member in engagement with the first fixture, the engagement member is spaced upwardly of the support member and a second position in which, with the locating member retained in engagement with the first fixture, the engagement member and the support member are mutually engaged.

11. Casing installation apparatus as claimed in claim 10, wherein the engagement member is annular and is movable on the casing.

12. Casing installation apparatus as claimed in claim 11, wherein the engagement member is in screw-threaded engagement with the casing.

13. Casing installation apparatus as claimed in claim 10, wherein the support member is movable on the second fixture.

14. Casing installation apparatus as claimed in claim 13, wherein the support member is in screw-threaded engagement with the second fixture.

15. Casing installation apparatus as claimed in claim 13, wherein the support member forms a downward-facing part of a wall of a chamber which has an inlet for pressurised fluid, and a lock member is provided for maintaining the engagement member and the support member in mutual engagement.

16. Casing installation apparatus as claimed in claim 10, including means for tensioning the casing prior to engagement between the engagement member and the support member.

17. A casing installation system, usable with tubular casing which has a main axis and upper and lower portions, for anchoring the upper portion on an outer casing string secured to a wellhead having a housing, the wellhead housing being at a fixed position over a well, the casing extending upwardly from a location in the well at which the lower portion of the casing engages the outer casing string, said outer casing string having an upwardly-facing shoulder and the upper portion of the casing having a corresponding downwardly-facing shoulder, said shoulders being relatively movable axially of the casing between a first position in which the downwardly-facing shoulder is spaced upwardly of the upwardly-facing shoulder and a second position in which said shoulders are in mutual engagement; and means for maintaining said shoulders in mutual engagement.

18. A casing installation system as claimed in claim 17, wherein the downwardly-facing shoulder is movable on the casing.

19. A casing installation system as claimed in claim 18, wherein the downwardly-facing shoulder is provided on an annular member which is in screw-threaded engagement with the casing.

20. A casing installation as claimed in claim 17, wherein the upwardly-facing shoulder is movable relative to the outer casing string.

21. A casing installation system as claimed in claim 20, wherein the upwardly-facing shoulder is provided on a casing head of the outer casing string.

22. A casing installation system as claimed in claim 20, wherein the upwardly-facing shoulder is provided on an annular member which is in screw-threaded engagement with the outer casing string.

23. A casing installation as claimed in claim 20, wherein the upwardly-facing shoulder is provided on an annular member which forms a downwardly-facing part of a sealed chamber having an inlet for pressurised fluid.

*24. A method of installing tubular casing through a blow-out preventer, the casing having a main axis and having a lower portion which has a locating member for engagement with a first fixture, and an upper portion which has an engagement member for engaging a support member on a second fixture in fixed spatial relationship to the first fixture, the engagement member and the support member being relatively movable in a direction axially of the casing, the method comprising setting the distance between the locating member and the engagement member greater than the distance between the first fixture and the support member, inserting the tubular casing through a blow-out preventer located on the second fixture, engaging the locating member with the first fixture, and bringing the engagement member and the support member into engagement, while the blow-out preventer is located above them on the second fixture, thereby to lock the casing between the first fixture and the support member.*

*25. A method as claimed in claim 24, wherein the engagement member is annular and is movable on the casing in a direction axially of the casing.*

*26. A method as claimed in claim 25, wherein the engagement member is in screw-threaded engagement with the casing.*

*27. A method as claimed in claim 24, wherein the support member is movable on the second fixture in a direction axially of the casing.*

*28. A method as claimed in claim 27, wherein the support member is in screw-threaded engagement with the second fixture.*

*29. A method as claimed in claim 27, wherein the support member is movable on the second fixture under the influence of fluid pressure, and the support member is brought into engagement with the engagement member by injecting pressurised fluid into a chamber, a portion of a wall of which is formed by the support member, the fluid pressure causing expansion of the chamber by upward movement of the support member.*

*30. A method as claimed in claim 24, wherein the engagement member comprises a downwardly-facing shoulder on the casing and the support member comprises a corresponding upwardly-facing shoulder on the second fixture.*

*31. A method as claimed in claim 24, wherein the casing is placed under tension by applying a force in an upward direction prior to bringing the engagement member and the support member into engagement.*

*32. Casing installation apparatus comprising a tubular casing having a main axis and having an upper portion and a lower portion, and a wellhead having a housing; the casing extending upwardly from a first location at which*

*the lower portion of the casing has a locating member in engagement with a first fixture to a second location at which a second fixture is in fixed spatial relationship to the first fixture, an engagement member on the casing at its said upper portion and a support member on the second fixture, the engagement member and the support member being located within the housing and being relatively movable in a direction axially of the casing between a first position in which, with the locating member in engagement with the first fixture, the engagement member is spaced upwardly of the support member and a second position in which with the locating member retained in engagement with the first fixture, the engagement member and the support member are mutually engaged.*

*33. Casing installation apparatus as claimed in claim 32, wherein the engagement member is annular and is movable on the casing.*

*34. Casing installation apparatus as claimed in claim 33, wherein the engagement member is in screw-threaded engagement with the casing.*

*35. Casing installation apparatus as claimed in claim 32, wherein the support member is movable on the second fixture.*

*36. Casing installation apparatus as claimed in claim 35, wherein the support member is in screw-threaded engagement with the second fixture.*

*37. Casing installation apparatus as claimed in claim 35, wherein the support member forms a downwardly-facing part of a wall of a chamber which has an inlet for pressurised fluid, and a lock member is provided for maintaining the engagement member and the support member in mutual engagement.*

*38. Casing installation apparatus as claimed in claim 32, including means for tensioning the casing prior to engagement between the engagement member and the support member.*

*39. A casing installation system usable with tubular casing which has a main axis and upper and lower portions, for anchoring the upper portion on an outer casing string secured to a wellhead having a housing, the wellhead housing being at a fixed position over a well, the casing extending upwardly from a location in the well at which the lower portion of the casing engages the outer casing string, said outer casing string having an upwardly-facing shoulder and the upper portion of the casing having a corresponding downwardly-facing shoulder, said shoulders being located within the housing and being relatively movable axially of the casing between a first position in which the downwardly-facing shoulder is spaced upwardly of the upwardly-facing shoulder and a second position in which said shoulders are in mutual engagement; and means for maintaining said shoulders in mutual engagement.*

*40. A casing installation system as claimed in claim 39, wherein the downwardly-facing shoulder is movable on the casing.*

*41. A casing installation system as claimed in claim 40, wherein the downwardly-facing shoulder is provided on an annular member which is in screw-threaded engagement with the casing.*

*42. A casing installation system as claimed in claim 39, wherein the upwardly-facing shoulder is movable relative to the outer casing string.*

*43. A casing installation system as claimed in claim 42, wherein the upwardly-facing shoulder is provided on a casing head of the outer casing string.*

*44. A casing installation system as claimed in claim 42, wherein the upwardly-facing shoulder is provided on an annular member which is in screw-threaded engagement with the outer casing string.*

*45. A casing installation system as claimed in claim 42, wherein the upwardly-facing shoulder is provided on an annular member which forms a downwardly-facing part of a sealed chamber having an inlet for pressurised fluid.*

* * * * *